(12) United States Patent
Adelman et al.

(10) Patent No.: US 6,656,577 B1
(45) Date of Patent: Dec. 2, 2003

(54) PROCESS FOR MAKING POLY(ETHYLENE-CO-ISOSORBIDE) TEREPHTHALATE POLYMER

(75) Inventors: Douglas J. Adelman, Wilmington, DE (US); Larry F. Charbonneau, West Chester, PA (US); Sophie Ung, New Castle, DE (US)

(73) Assignee: E. I. du Pont de Nemours & Company, Wilmington, DE (US)

( * ) Notice: Subject to any disclaimer, the term of this patent is extended or adjusted under 35 U.S.C. 154(b) by 0 days.

(21) Appl. No.: 10/171,924

(22) Filed: Jun. 14, 2002

(51) Int. Cl.⁷ .......................... B32B 7/02; B32B 19/00; B29C 47/00
(52) U.S. Cl. ................. 428/221; 528/190; 528/194; 528/195; 528/198; 528/275; 528/298; 528/300; 528/302; 528/308; 528/308.6; 524/81; 524/779; 264/176.1; 264/177.17; 264/211.12; 264/280; 264/291; 264/299; 428/357; 428/480
(58) Field of Search ................................. 528/190, 194, 528/195, 198, 275, 298, 300, 302, 308, 308.6; 524/81, 779; 264/176.1, 177.17, 211.12, 280, 291, 299; 428/357, 480, 221

(56) References Cited

U.S. PATENT DOCUMENTS

| | | | |
|---|---|---|---|
| 5,912,307 A | | 6/1999 | Paschke et al. |
| 5,958,581 A | | 9/1999 | Khanarian et al. |
| 5,959,066 A | | 9/1999 | Charbonneau et al. |
| 6,025,061 A | * | 2/2000 | Khanarian et al. .......... 428/221 |
| 6,063,464 A | | 5/2000 | Charbonneau et al. |
| 6,063,465 A | | 5/2000 | Charbonneau et al. |
| 6,063,495 A | | 5/2000 | Charbonneau et al. |
| 6,126,992 A | * | 10/2000 | Khanarian et al. .......... 427/162 |

* cited by examiner

Primary Examiner—Samuel A. Acquah

(57) ABSTRACT

The present invention is a process for making a low color copolymer of ethylene glycol, isosorbide and terephthalic acid or dimethyl terephthalate. This copolymer, poly(ethylene-co-isosorbide) terephthalate, is useful for making bottles, hot-fill containers, films, sheet, fiber, strand and optical article applications. It can also be used to make polymer blends and alloys.

35 Claims, No Drawings

PROCESS FOR MAKING POLY(ETHYLENE-CO-ISOSORBIDE) TEREPHTHALATE POLYMER

FIELD OF THE INVENTION

The present invention is a process for making poly(ethylene-co-isosorbide) terephthalate polymer that has low color and low diethylene glycol (DEG) content.

TECHNICAL BACKGROUND OF THE INVENTION

The diol 1,4:3,6-dianhydro-D-sorbitol, referred to herein as isosorbide, is readily made from renewable resources, such as sugars and starches. For example, isosorbide can be made from D-glucose by hydrogenation followed by acid-catalyzed dehydration.

Poly(ethylene-co-isosorbide) terephthalate polymer (PEIT) is a polymer with a higher glass transition temperature (Tg) than polyethylene terephthalate (PET). This positions it for use in products such as bottles, hot-fill containers, film, thick sheet, fibers, strand and optical articles. In many of these markets, aesthetics are important, and having a very low color resin is highly desirable. To maximize the Tg-enhancing effects of isosorbide, it may also be desirable to minimize the presence of Tg-reducing impurities, such as diethylene glycol (DEG).

U.S. Pat. No. 5,912,307 discloses the use of tetramethylammonium hydroxide (TMAH) to suppress DEG formation in the melt polymerization of ethylene glycol with mixtures of the aromatic diacids, terephthalic acid, isophthalic acid and 2,6-naphthalenedicarboxylic acid.

U.S. Pat. No. 5,959,066 discloses polyesters that include isosorbide as a co-monomer and methods for making them (Charbonneau et al.). This patent discloses process steps to obtain isosorbide-containing polymers from esterification to solid-state polymerization. No mention is made concerning the need to obtain polymer with low color. Example 2 describes the preparation of isosorbide-containing polyesters with 1% DEG content without the use of TMAH.

U.S. Pat. No. 6,063,465 discloses the range of isosorbide content in PEIT resins suitable for making polyester containers, processes for making such resin, and a method for making containers from that resin. Melt polymerization processes are described using either dimethyl terephthalate or terephthalic acid as the acid component. This patent is hereby incorporated by reference (Charbonneau, Johnson).

U.S. Pat. No. 6,063,464 describes isosorbide-containing polyesters and methods for making same (Charbonneau et al.). The patent claims the composition of isosorbide containing polyesters and a process for their solid-state polymerization. The possible applications include beverage bottle, film or sheet, fibers, optical materials, and compact disc or digital versatile disc. The patent does not make mention of any process conditions aimed at the minimization of color or DEG content.

U.S. Pat. No. 5,958,581 describes polyester film and methods for making the same (Khanarian et al.). Film comprised of isosorbide-containing polyester is claimed. Several compositions are claimed. No mention is made concerning color or DEG content.

U.S. Pat. No. 6,063,495 describes PEIT fiber and methods for making the same. It is noted that DEG may be produced as a by-product of the polymerization process. It is noted that polymer without DEG is obtainable in a solution polymerization process. However, there is no disclosure concerning minimizing DEG formation in a melt polymerization process. There is also no mention of color formation.

SUMMARY OF THE INVENTION

This invention provides a melt polymerization process for the preparation of poly(ethylene-co-isosorbide) terephthalate (PEIT), comprising:

a) providing a mixture comprising terephthalic acid or its alkyl ester, ethylene glycol and isosorbide, wherein the molar ratio of diols to terephthalic acid or its alkyl ester is from about 1.05:1 to about 1.3:1 and the molar ratio of ethylene glycol to isosorbide is from about 1.2:1 to about 24:1;

b) reacting the mixture in an inert atmosphere at a temperature in the range 180–255° C. and a pressure in the range of 0–60 psig, with concurrent removal of a distillate comprising water or volatile alkanol products derived from the reaction of terephthalic acid or its ester with ethylene glycol and isosorbide, wherein the distillate contains less than about 5 wt % ethylene glycol and less than about 1 wt % isosorbide; and c) continuing the reaction in the presence of a polycondensation catalyst at a pressure of about 0.25 to about 2 mm and a temperature of 260 to 275° C. to form a PEIT having a Hunter b* color value between about −2.0 and about +2.0.

The present invention also relates to the low color PEIT polymers made by this process.

The present invention also relates to bottles, hot-fill containers, films, thick sheet, optical articles, fibers, strand and polymer blends and alloys made from the PEIT polymer of the process described herein.

DETAILED DESCRIPTION OF THE INVENTION

The present invention is a process to make PEIT polymer that has low color for use in hot-fill container, bottle, thick sheet, film, fiber, strand, optical articles and other applications. Color is commonly expressed in terms of Hunter numbers which correspond to the lightness or darkness ("L") of a sample, the color value ("a*") on a red-green scale, and the color value ("b*") on a yellow-blue scale. It is usually desired to produce polymers with "L" between 80 and 100, preferably 90 to 100. Similarly, for low color polymers, "a*" and "b*" are preferably between about −2.0 and about +2.0, more preferably between about −1.0 and about +1.0, as measured by the process described herein. It has been found that these objectives can be met for PEIT without the use of color-correcting additives by controlling critical process parameters at each stage of the process, especially temperature and pressure.

For low color PEIT, it is also important to eliminate, or at least minimize, the color-forming impurities present in the monomer diols. Preferably, the UV absorbance of ethylene glycol and isosorbide are less than 0.20 at 220 nm, more preferably less than 0.10.

The choice of polycondensation catalyst also influences the color of the final polymer. Suitable catalysts include Sb(III) or Ti(IV) salts; acetate and other alkanoate salts of Co(II), and Sb(III); oxides of Sb(III); oxides of Sb(III) and Ge(IV); and Ti(OR)$_4$, where R is an alkyl group having 2 to 12 carbon atoms. Glycol solubilized oxides of these metal salts may also be used. Oxides of Ge such as GeO$_2$ are preferred. The preferred amount of polycondensation catalyst is generally from about 10 to about 300 ppm by weight.

More specifically, the molar ratio of catalyst to terephthalic acid or its ester is about 1:1000 to about 1:7300, preferably about 1:2200 to about 1:4400.

Inclusion of the isosorbide monomer raises the Tg of the final PEIT polymer (relative to PET), while DEG incorporation into the polymer tends to lower the Tg. DEG can be formed, and subsequently incorporated into the polymer, when terephthalic acid is used in the polymerization process. For applications in which low DEG is desired and the polymerization process uses terephthalic acid, one can add a suitable base and also minimize the ratio of ethylene glycol to diacid in the initial esterification reaction. It has been found that adding suitable bases with the monomers charged to the reactor suppresses DEG formation in PEIT polymers. Suitable bases include sodium acetate, sodium hydroxide, and tetramethylammonium hydroxide (TMAH). An effective amount of base is about 10 to about 300 ppm, based on terephthalic acid. In examples herein, the combination of germanium oxide ($GeO_2$) and TMAH give especially low color and low DEG content polymer when terephthalic acid is used in the process. For applications needing high Tg values, the DEG content is preferably less than about 1.5 mol %, more preferably less than about 1.0 mol %.

The polymerization process of this invention is a condensation polymerization of ethylene glycol, isosorbide, and terephthalic acid or its alkyl ester. Suitable terephthalic acid esters for the process of this invention include mono- and di-alkyl esters of terephthalic acid, wherein the alkyl group is chosen from the group of $C_1$ to $C_6$ alkyls. Dimethyl terephthalate is a preferred terephthalic acid ester. The molar ratio of diols (ethylene glycol and isosorbide) to terephthalic acid (or its ester) is from about 1.05:1 to about 1.3:1, and the molar ratio of ethylene glycol to isosorbide is from about 1.2:1 to about 24:1, preferably from about 6:1 to about 18:1.

The polymerization process can be carried out in either batch, semi-continuous or continuous mode. The process is best carried out in a reactor equipped with a distillation column and a stirrer or other means for agitation. The distillation column separates the volatile product of reaction (water and/or alkanol) from volatile reactants (e.g., ethylene glycol and isosorbide). Use of a distillation column allows for operation at a lower molar ratio of ethylene glycol to terephthalic acid, which serves to suppress the formation of DEG. When terephthalic acid is used in the polymerization process, the volatile reaction product will be water; when an ester such as dimethyl terephthalate is used, the volatile reaction product will be the corresponding alkanol (such as methanol), together with smaller amounts of water.

The reactants (terephthalic acid or its ester, ethylene glycol and isosorbide) and other optional catalysts and additives are loaded into the reactor, and if necessary, the reactor is purged to remove traces of oxygen. Inert gases such as nitrogen can be used for this purpose. Polymerization starts by heating the reactants in an inert atmosphere at a pressure between about 0 and about 60 psig and removing the water and/or alkanol and other volatile by-products via distillation. The temperature is initially increased to about 220° C. when terephthalic acid is used or to about 180° C. when a terephthalic acid ester is used, and then more slowly to a final temperature of between 230 to 255° C. The bulk of the water and/or alkanol are removed over about a 1 to 8 hour period.

The pressure chosen depends on the efficiency of the distillation column and on the ratio of ethylene glycol to isosorbide. At a ratio of 9 or less, one may generally operate at about 0 psig. At higher ratios, the pressure is increased to make it easier to separate ethylene glycol from the water and/or alkanol formed during the reaction of ethylene glycol, isosorbide and terephthalic acid or its ester. However, increasing the pressure also makes it more difficult to remove volatile color-forming impurities by distillation, so it is generally preferred to operate at the minimum pressure necessary to maintain acceptably low ethylene glycol losses in the distillate.

It should also be noted that the boiling point of the reaction mixture is a function of the composition of the mixture, and more specifically of the ratio of isosorbide to ethylene glycol. At high ratios, the boiling point increases, and the higher temperature of the reaction mixture results in an increased rate of reaction and associated water and/or alkanol production. Conversely, when the ratio of isosorbide to ethylene glycol is low, the boiling point of the reaction mixture is lower, leading to a lower temperature of the reaction mixture. The overall effect of a low isosorbide to ethylene glycol ratio is that the esterification reaction proceeds more slowly and the percentage of ethylene glycol in the distillate increases.

At least 80%, preferably at least 90%, of the water and/or alkanol of reaction is removed as the temperature of the reaction mixture is increased, for example from 220° C. (for terephthalic acid) or 180° C. (for terephthalic acid esters), to a temperature between 230 and 255° C. Limiting the maximum reaction mixture temperature to 255° C. minimizes the formation of color-forming by-products. It is preferred that this step also be conducted under temperature and pressure conditions that selectively remove water and/or alkanol and return ethylene glycol to the reactor. Preferably, the distillate contains less than about 5 wt % ethylene glycol and less than about 1 wt % isosorbide. This can be achieved by adjusting the temperature of the reaction mixture so that the temperature of the vapor at the top of the distillation column (overhead vapor) does not exceed the boiling point of water (if terephthalic acid is used in the process) or alkanol (if a terephthalic acid ester is used in the process) at the reactor pressure. If the temperature of the overhead vapor exceeds the boiling point of water (or alkanol), then the temperature of the reaction mixture is lowered and no distillate is taken off until the overhead vapor temperature goes below the boiling point of water (or alkanol) at the reactor pressure.

When the temperature of the reaction mixture reaches a temperature between 230 and 255° C. and the overhead vapor temperature drops to about 2 to 20° C., preferably about 5° C., below the boiling point of water or alkanol at the reactor pressure, the reactor pressure is reduced to about atmospheric pressure at a rate of about 0.5 to 5 psi/min., preferably about 1–2 psi/min. As the reactor pressure drops, additional water or alkanol will distill from the reactor. The optimal rate of pressure reduction is determined by the temperature of the overhead vapor. If the overhead vapor temperature exceeds that of the boiling point of water or alkanol at the reactor pressure, the rate of pressure reduction is decreased. Conversely, if the temperature of the overhead vapor is below the temperature of the boiling point of water or alkanol at the reactor pressure, the rate of pressure reduction is increased. If the total amount of water or alkanol removed when the reactor is at atmospheric pressure is less than the desired amount, the pressure can be lowered to about 80 mm Hg (for terephthalic acid) or to about 125 mm Hg (for dimethyl terephthalate) to further drive the esterification reaction. For other terephthalic acid esters, the pressure can be lowered to that at which the alkanol boils at ambient temperature. Generally, it is preferable to remove a total of at least 90% of the volatile reaction products (water and/or alkanol) before going on to the next stage of the polymerization process.

The next stage of the polymerization process is polycondensation, in which the esters and oligomers are reacted to form polymer, with removal of residual ethylene glycol, isosorbide and water and/or alkanol. If a polycondensation catalyst was not added with the monomers, it is added at this stage, optionally with other desired additives such as infrared absorbing agents, dyes, pigments, UV stabilizers and other thermally stable additives.

Color-correcting additives can be added selected from the group consisting of red, orange, yellow, blue, green, indigo and violet. Examples of such dyes or pigments include cobalt acetate, HS-325 Sandoplast® Red BB, HS-510 Sandoplast® Blue 2B, Polysynthren® Blue R, and Clariant® RSB violet are especially useful to lower the b* value of the PEIT polymer. The reactor pressure is then reduced to about 0.25 to 2 mm Hg, preferably to about 0.25–1 mm Hg. The temperature of the reaction mixture is raised to 260 to 275° C. while the pressure is lowered. The reaction mixture is held at this temperature and pressure for about 1 to 4 hours to form the desired PEIT polymer. Minimizing time at high temperatures helps to minimize color generation in the PEIT polymer.

The polymer can be removed from the reactor and isolated in any of several conventional processes as strands, pellets or flake. An inherent viscosity (IV) of 0.5 dL/g or higher can be achieved by this melt polymerization process. The IV can be further increased by solid state polymerization of the isolated polymer.

The defined process conditions give a PEIT polymer product that has low color and low DEG content resin for use in hot-fill container, bottle, fiber, optical articles, film and thick sheet applications. The PEIT of this invention can also be used in making polymer blends and alloys

EXAMPLES

Molecular weights were determined by size exclusion chromatography (SEC). The SEC system consists of a Waters (Milford, Mass.) Alliance 2690 with the solvent vacuum degasser and auotoinjection system. A Viscotek (Houston, Tex.) T60A combination viscometer/light scattering detector is followed by a Waters 410 refractive index detector. Two Shodex (Tokyo, Japan) GPC HFIP-806M linear columns are proceeded by a corresponding precolumn. The chromatograph oven holds the columns at 35° C. The T60A detectors are at ambient temperature and the refractive index detector is held at 35° C. A 10 mg sample is weighed into a 20 ml glass vial. To the vial is added 5 ml of hexafluoroisopropanol. The sample is placed on a shaker for 1–2 hours for dissolution. If the sample requires heat to dissolve, it is place on a dry bath (VWR, South Plainfield, N.J.) containing plastic beads. The surface temperature of the dry bath is held at 80° C. The sample never reaches the boiling point of HFIP (59° C). The sample is filtered through a 0.5 micron PTFE filter (Millipore) prior to injection of 100 µl into the SEC unit. The data are collected and analyzed using the Viscotek TriSec 3.0 software.

DSC was used to determine Tg values. The polymer sample (10 mg) is analyzed with a TA Instruments 2920 DSC from room temperature to 280° C. using a heating rate of 10° C./min. The sample is then held at 280° C. for two minutes, quenched in liquid nitrogen, and then reheated from room temperature to 280° C. The associated software calculates a Tg, Tc, and Tm.

Isosorbide and diethylene glycol content were determined by NMR. The PEIT is prepared for analysis by hot pressing at about 260° C. and cold quenching (ice bath). About 20 mg of the resulting film is dissolved in about 1 mL trichloroethane-d2. The sample is analyzed at 100° C. using a Varian (Palo Alto, Calif.) 500 MHz spectrometer.

The color and brightness of the PEIT samples were determined using a Varian Cary 5 UVNis/NIR spectrophotometer with a diffuse reflectance accessory. The reflectance data were obtained at an observer angle of 2 degrees with Illuminant D65 and were processed using the color analysis application within Grams/32 software to calculate Hunter L*a*b* values. The L* coordinate indicates brightness, where 0 is black and 100 is white. The a* value can be positive or negative, where positive values are indicative of red color and negative indicate green. Similar is the b* value, where positive values indicate yellow and negative values indicate blue.

Intrinsic viscosities were measured using a Viscotek Forced Flow Viscometer model Y-900. Polymers were dissolved in 50/50 w/w trifluoroacetic acid/methylene chloride at a 0.4% (wt/vol) concentration and were tested at 19° C. The intrinsic viscosities determined by this method are equivalent to Goodyear intrinsic viscosities.

COOH end groups were determined using Fourier Transform Infrared spectroscopy on polyester samples that had been dried and pressed into film. Peak absorptions were found at 3434 cm-1 with respect to a baseline drawn from 3473 to 3386 and at 3266 with respect to a baseline drawn from 3717 to 620. The ratio of the 3434 to 3266 peak absorptions was compared to a calibration chart of such ratios versus titration data to obtain the concentration of COOH end groups. OH end groups were then calculated from the COOH end groups and the DP that had been determined from the IV, using the formula $$OHends, \text{meq/kg} = \left(\frac{2*106}{(192*DP+33)}\right) - [COOH]$$

Germanium oxide solution was supplied by Teck Cominco LTD, North Vancouver, BC, Canada. Isosorbide was supplied by Roquette Freres in Lestrem, France. Ethylene glycol was supplied by PD Glycol in Beaumont, Tex. Terephthalic acid was supplied by Amoco, in Naperville, Ill. Dimethyl terephthalate was supplied by Kosa, in Wilmington, N.C. Cobalt acetate is available from Aldrich (Milwaukee, Wis.). HS-325 Sandoplast® Red BB, HS-510 Sandoplast® Blue 2B, Polysynthren® Blue R, and Clariant® RSB violet are available from Clariant Corporation (Coventry, R.I.). Graphite was supplied by Timcal America, Inc. of Westlake, Ohio.

The following examples are for illustrative purposes and are not limiting.

Example 1

A 100 gal agitated vessel, equipped with a column and in-line condenser, was charged with 87.88 lb. of terephthalic acid (Amoco TA-33-LP), 36.81 lb ethylene glycol, 6.16 lb of isosorbide, 99.8 ml of GeO₂ solution (0.15 g Ge/ml), 31.9 ml tetramethylammonium hydroxide (Aldrich 25 wt % aqueous solution), and 0.3819 graphite (Timrex KS-4). After 3 nitrogen pressure/purge cycles, the unit was pressured to 40 psig and the circulated oil heat setpoint was set to 285° C. The condensate valve setpoint was 145° C. If the vapor temperature at the top of the column (overhead vapor) was less than 145° C., the condensate valve remained open and water was removed. When the temperature of the reaction mixture reached 250° C. and the overhead vapor temperature dropped to less than 140° C., the pressure was dropped at a rate such that the overhead vapor temperature did not exceed the boiling point of water at the batch pressure. After 6.5 liters of water were removed, the reaction mixture was clear. The reaction mixture was then transferred to a 30 gal autoclave and heated to 265° C. as the pressure was dropped to 0.5 mm Hg over 30 minutes. After 2 hours and 15 minutes, the batch had reached the target agitator torque value of 1900 watts. The melt was extruded under nitrogen pressure through a die plate to make strands. The strands were pulled through water troughs and into a cutter to make ⅛" pellets. The yield was 88.9 lb of wet pellets. The condensate contained 95.9 wt % water and 4.1 wt % ethylene glycol. The product IV was 0.58 dL/g. The Hunter b* and L values were 0.88 and 86.6. The isosorbide incorporation was 2.73 M % and the DEG was 1.04 M %. The Tg was 86.3° C. and the Tm was 238.5° C. The meq/kg acid ends were 18.8. The Mw/Mn value was 1.83 with 8.4% having a MW<10,000.

Example 2

A 100 gal agitated vessel, equipped with a column and in-line condenser, was charged with 87.88 lb. of terephthalic acid (Amoco TA-33-LP), 37.56 lb ethylene glycol, 4.40 lb of isosorbide, 99.8 ml of GeO2 solution (0.15 g Ge/ml), 31.9 ml tetramethylammonium hydroxide (Aldrich 25 wt % aqueous solution), and 0.3782 graphite (Timrex KS-4). After 3 nitrogen pressure/purge cycles, the unit was pressure to 30 psig and the circulated oil heat setpoint was set to 275° C. The condensate valve setpoint was 140° C. If the vapor temperature at the top of the column was less than 140° C., the condensate valve remained open and water was removed. When the temperature of the reaction mixture reached 250° C. and the overhead vapor temperature dropped to less than 140° C., the pressure was dropped at a rate such that the overhead vapor temperature did not exceed the boiling point of water at the batch pressure. After 6.4 liters of water were removed, the batch was clear. The batch was then transferred to a 30 gal autoclave and heated to 265° C. as the pressure was dropped to 0.5 mm Hg over 30 minutes. After 1 hour and 41 minutes, the batch had reached the target agitator torque value of 1900 watts. The melt was extruded under nitrogen pressure through a die plate to make strands. The strands were pulled through water troughs and into a cutter to make ⅛" pellets. The yield was 88 lb of wet pellets. The condensate contained 95.5 wt % water and 4.5 wt % ethylene glycol. The product IV was 0.61 dL/g. The Hunter b* and L values were 1.2 and 80.0. The isosorbide incorporation was 2.11 M % and the DEG was 0.97 M %. The Tg was 85.4° C. and the Tm was 242.0° C. The meq/kg acid ends were 27.2. The Mw/Mn value was 1.90 with 8.4% having a MW<10,000.

Example 3

A 100 gal agitated vessel, equipped with a column and in-line condenser, was charged with 117.18 lb. of terephthalic acid (Amoco TA-33-LP), 45.20 lb ethylene glycol, 7.04 lb of isosorbide, 128 ml of GeO2 solution (0.15 g Ge/ml), 38.2 ml tetramethylammonium hydroxide (Aldrich 25 wt % aqueous solution), 0.630 g graphite (Timrex KS-4) and 0.252 g of Clariant RSB violet toner. After 3 nitrogen pressure/purge cycles, the unit was pressured to 40 psig and the circulated oil heat setpoint was set to 285° C. The condensate valve setpoint was 145° C. If the vapor temperature at the top of the column was less than 145° C., the condensate valve remained open and water was removed. When the temperature of the reaction mixture reached 250° C. and the overhead vapor temperature dropped to less than 140° C., the pressure was dropped at a rate such that the overhead vapor temperature did not exceed the boiling point of water at the batch pressure. After 8.8 liters of water were removed, the reaction mixture was clear. The batch was then transferred to a 30 gal autoclave and heated to 275° C. as the pressure was dropped to 0.5 mm Hg over 30 minutes. After 1 hour and 45 minutes, the batch had reached the target agitator torque value of 1500 watts. The melt was extruded under nitrogen pressure through a die plate to make strands. The strands were pulled through water troughs and into a cutter to make ⅛" pellets. The yield was 88 lb of wet pellets. The condensate was 100 wt % water. The product IV was 0.62 dL/g. The Hunter b* and L values were 1.5 and 80.0. The isosorbide incorporation was 2.71 M % and the DEG was 1.09 M %. The Tg was 86.9° C.

Example 4

A 10 liter agitated vessel, equipped with a column and in-line condenser, was charged with 9.15 lb. of terephthalic acid (Amoco TA-33-LP), 3.37 lb ethylene glycol, 0.53 lb of isosorbide, 8.0 ml of GeO2 solution (0.10 g Ge/ml), 1.95 ml tetramethylammonium hydroxide (Aldrich 25 wt % aqueous solution), 4.4 ml Clariant RSB violet dye (0.00485 g/ml), and 0.05 g graphite (Timrex KS-4). After 3 nitrogen pressure/purge cycles, the unit was pressured to 30 psig and the Dow heater setpoint was adjusted to give an initial batch temperature of 210° C. The condensate valve setpoint was 135° C. If the vapor temperature at the top of the column was less than 135° C., the condensate valve remained open and water was removed. After 774 ml of water were removed, the batch was heated to 275° C. while the pressure was dropped to 0.5 mm Hg over 30 minutes. After 2 hour and 10 minutes, the batch had reached the target agitator torque value. The melt was extruded under nitrogen pressure through a die plate to make strands. The strands were pulled through water troughs and into a cutter to make ⅛" pellets. The condensate contained 98.9 wt % water and 1.1 wt % ethylene glycol. The product IV was 0.59 dL/g. The Hunter b* and L values were—1.12 and 73.7. The isosorbide incorporation was 2.58 M % and the DEG was 0.84 M %. The Tg was 86.3° C.

Example 5

A 10 liter agitated vessel, equipped with a column and in-line condenser, was charged with 4.58 lb. of terephthalic acid (Amoco TA-33-LP), 2.09 lb. ethylene glycol, 0.33 lb. of isosorbide, 9.4 ml of GeO2 solution (0.15 g Ge/ml), and 0.2 ml tetramethylammonium hydroxide (Aldrich 25 wt % aqueous solution). The isosorbide used had a UV absorbance of 0.124 at 220 nm for a 20 wt % water solution. After 3 nitrogen pressure/purge cycles, the unit was pressured to 10 psig and the Dow heater setpoint was adjusted to give an initial batch temperature of 210° C. The condensate valve setpoint was 115° C. If the vapor temperature at the top of the column was less than 115° C., the condensate valve remained open and water was removed. The batch was slowly heated to 250° C. while condensate was removed. After 417 ml of water were removed, the batch was heated to 270° C. while the pressure was dropped to 0.5 mm Hg over 10 minutes. After 1.5 hour, melt was extruded under nitrogen pressure through a die plate to make strands. The strands were pulled through water troughs and into a cutter to make ⅛" pellets. The condensate contained 96.6 wt % water and 3.4 wt % ethylene glycol. The product IV was 0.33 dL/g. The Hunter b* value was 1.63. The isosorbide incorporation was 2.54 M % and the DEG was 1.30 M %. The Tg was 89.8° C.

Example 6

A 100 gal agitated vessel, equipped with a column and in-line condenser, was charged with 87.88 lb. of terephthalic acid (Amoco TA-33-LP), 36.81 lb. ethylene glycol, 6.16 lb. of isosorbide, 99.8 ml of $GeO_2$ solution (0.15 g Ge/ml), 31.9 ml tetramethylammonium hydroxide (Aldrich 25 wt % aqueous solution), and 0.381 g graphite (Timrex KS-4). After 3 nitrogen pressure/purge cycles, the unit was pressured to 40 psig and the circulated oil heat setpoint was set to 280° C. The condensate valve setpoint was 145° C. If the vapor temperature at the top of the column was less than 145° C., the condensate valve remained open and water was removed. When the temperature of the reaction mixture reached 250° C. and the overhead vapor temperature dropped to less than 140° C., the pressure was dropped at a rate such that the overhead vapor temperature did not exceed the boiling point of water at the batch pressure. After 6.3 liters of water were removed, the reaction mixture was clear. The reaction mixture was then transferred to a 30 gal autoclave and heated to 265° C. as the pressure was dropped to 0.5 mm Hg over 30 minutes. After 2.1 hours, the batch had reached the target agitator torque value of 1900 watts. The melt was extruded under nitrogen pressure through a die plate to make strands. The strands were pulled through water troughs and into a cutter to make ⅛" pellets. The yield was 67 lb. of wet pellets. The condensate contained 95.7 wt % water and 4.3 wt % ethylene glycol. The product IV was 0.59 dL/g. The Hunter b* and L values were 1.74 and 77.5. The isosorbide incorporation was 2.84 M % and the DEG was 1.05 M %. The Tg was 86.3° C. and the Tm was 237.2° C. The meq/kg acid ends were 19.2. The Mw/Mn value was 2.0 with 10.4% having a MW<10,000.

Example 7

A 2 liter agitated glass vessel, equipped with a column and in-line condenser, was charged with 388.4 g of dimethyl terephthalate, 152.2 g ethylene glycol, 21.8 g of isosorbide (Roquette 3085), 0.80 ml of $GeO_2$ solution (0.15 g Ge/ml), and 0.5 ml tetramethylammonium hydroxide (Aldrich 25 wt % aqueous solution). After 3 vacuum/nitrogen refill cycles, the pressure was about 0 psig and the oil bath heater setpoint was adjusted to 180° C. The condensate valve setpoint was 67° C. If the vapor temperature at the top of the column was less than 67° C., the condensate valve remained open and MeOH was removed. After 154 ml of MeOH were removed without exceeding a batch temperature of 250° C., the batch was heated to 270° C. while the pressure was dropped to 1.1 mm Hg. After 1 hour and 35 minutes, the batch had reached the target agitator torque value. The melt was poured into cold water to make strands. The condensate contained approximately 98.0 wt % MeOH, approximately 1.5 wt % water, and no ethylene glycol. The product IV was 0.36 dL/g. The Hunter b* and L values were 2.24 and 90.3. The isosorbide incorporation was 2.33 M % and the DEG was 1.75 M %.

Example 8

A 2 liter agitated glass vessel, equipped with a column and in-line condenser, was charged with 388.4 g of dimethyl terephthalate, 133.6 g ethylene glycol, 21.8 g of isosorbide (Roquette 3085), 0.80 ml of $GeO_2$ solution (0.15 g Ge/ml), and 0.45 ml tetramethylammonium hydroxide (Aldrich 25 wt % aqueous solution). After 3 vacuum/nitrogen refill cycles, the pressure was about 0 psig and the oil bath heater setpoint was adjusted to 150° C. The condensate valve setpoint was 67° C. If the vapor temperature at the top of the column was less than 67° C., the condensate valve remained open and MeOH was removed. After 144 ml of MeOH were removed without exceeding a batch temperature of 255° C., the batch was heated to 270° C. while the pressure was dropped to 1 mm Hg. After 1 hour and 30 minutes, the batch had reached the target agitator torque value. The melt was poured into cold water to make strands. The condensate contained approximately 98.6 wt % MeOH, approximately 1.4 wt % water, and no ethylene glycol. The product IV was 0.29 dL/g. The Hunter b* and L values were 1.93 and 91.4. The isosorbide incorporation was 2.72 M % and the DEG was 1.36 M %.

Examples 7 and 8 were run at relatively small scale (2 liter) and one skilled in the art will recognize that equipment limitations at this scale could have contributed to the relatively large b* values (2.24 and 1.93, respectively) of the PEIT polymer produced in these examples. It is expected that these process conditions, if duplicated at 10 liter or 100 gal or larger scale, would give b* values less than about 2.0 for the PEIT polymers so produced.

Comparative Example 1

Demonstrating the Effect of High Esterification and Polycondensation Temperatures A 10 liter agitated vessel, equipped with a column and in-line condenser, was charged with 4.58 lb of terephthalic acid (Amoco TA-33-LP), 2.09 lb ethylene glycol, 0.33 lb of isosorbide, 9.4 ml of $GeO_2$ solution (0.15 g Ge/ml), and 0.2 ml tetramethylammonium hydroxide (Aldrich 25 wt % aqueous solution). The isosorbide used had a UV absorbance of 0.124 at 220 nm for a 20 wt % water solution. After 3 nitrogen pressure/purge cycles, the unit was pressured to 10 psig and the Dow heater setpoint was adjusted to give an initial batch temperature of 210° C. The condensate valve setpoint was 115° C. If the vapor temperature at the top of the column was less than 115° C., the condensate valve remained open and water was removed. The batch was slowly heated to 270° C. while condensate was removed. After 406 ml of water were removed, the batch was heated to 285° C. while the pressure was dropped to 0.5 mm Hg over 10 minutes. After 1.5 hour, melt was extruded under nitrogen pressure through a die plate to make strands. The strands were pulled through water troughs and into a cutter to make ⅛" pellets. The condensate contained 96.6 wt % water and 3.4 wt % ethylene glycol. The product IV was 0.61 dL/g. The Hunter b* value was 2.21. The isosorbide incorporation was 2.37 M % and the DEG was 1.54 M %. The Tg was 87.8° C.

Comparative Example 2

Demonstrating the Effect of Isosorbide Containing UV-Absorbing Impurities

A 100 gal agitated vessel, equipped with a column and in-line condenser, was charged with 117.2 lb of terephthalic acid (Amoco TA-33-LP), 51.3 lb ethylene glycol, 8.25 lb of isosorbide, 133.1 ml of $GeO_2$ solution (0.15 g Ge/ml), and 49.9 ml tetramethylammonium hydroxide (Aldrich 25 wt % aqueous solution). The isosorbide had a UV absorbance of 3.83 at 220 nm for a 20 wt % aqueous solution. After 3 nitrogen pressure/purge cycles, the unit was pressured to 40 psig and the circulated oil heat setpoint was set to 280° C. The condensate valve setpoint was 145° C. If the vapor temperature at the top of the column was less than 145° C., the condensate valve remained open and water was removed. When the temperature of the reaction mixture reached 250° C. and the overhead vapor temperature dropped to less than 140° C., the pressure was dropped at a rate such that the overhead vapor temperature did not exceed the boiling point of water at the batch pressure. After 6.3 liters of water were removed, the reaction mixture was clear. The batch was then transferred to a 30 gal autoclave and heated to 270° C. as the pressure was dropped to 0.5 mm Hg over 30 minutes. After 2 hour and 55 minutes, the batch had reached the target agitator torque value of 1600 watts. The melt was extruded under nitrogen pressure through a die plate to make strands. The strands were pulled through water troughs and into a cutter to make ⅛" pellets. The yield was 110 lb of wet pellets. The condensate contained 98.5 wt % water and 1.5 wt % ethylene glycol. The product IV was 0.59 dL/g. The Hunter b* and L values were 5.1 and 67.0. The isosorbide incorporation was 2.24 M % and the DEG was 1.40 M %. The Tg was 84.9° C. and the Tm was 238.2° C.

Comparative Example 3

Demonstrating the Effect of High Polycondensation Temperature

To a 10 liter agitated vessel, equipped with a column and in-line condenser, was charged 4.58 lb. of terephthalic acid (Amoco TA-33-LP), 1.68 lb. ethylene glycol, 0.82 lb. of isosorbide, 9.4 ml of $GeO_2$ solution (0.15 g Ge/ml), and 0.2 ml tetramethylammonium hydroxide (Aldrich 25 wt % aqueous solution). After 3 nitrogen pressure/purge cycles, the unit was pressured to 10 psig and the Dow heater setpoint was adjusted to give an initial batch temperature of 210° C. The condensate valve setpoint was 115° C. If the vapor temperature at the top of the column was less than 115° C., the condensate valve remained open and water was removed. The batch was slowly heated to 250° C. while condensate was removed. After 403 ml of water were removed, the batch was heated to 285° C. while the pressure was dropped to 0.5 mm Hg over 10 minutes. After 1.5 hour, melt was extruded under nitrogen pressure through a die plate to make strands. The strands were pulled through water troughs and into a cutter to make ⅛" pellets. The isosorbide used had a UV absorbance of 0.124 at 220 nm for a 20 wt % water solution. The condensate contained 99.0 wt % water and 1.0 wt % ethylene glycol. The product IV was 0.62 dL/g. The Hunter b value was 3.2. The isosorbide incorporation was 2.66 M % and the DEG was 1.1 M %. The Tg was 83.4° C.

What is claimed is:

1. A melt polymerization process for the preparation of poly(ethylene-co-isosorbide)terephthalate (PEIT), comprising:
   a) providing a mixture comprising terephthalic acid or its alkyl ester, ethylene glycol and isosorbide, wherein the molar ratio of diols to terephthalic acid or its alkyl ester is from about 1.05:1 to about 1.3:1 and the molar ratio of ethylene glycol to isosorbide is from about 1.2:1 to about 24:1;
   b) reacting the mixture in an inert atmosphere at a temperature in the range 180–255° C. and a pressure in the range of 0–60 psig, with concurrent removal of a distillate comprising water or volatile alkanol products derived from the reaction of terephthalic acid or its ester with ethylene glycol and isosorbide, wherein the distillate contains less than about 5 wt % ethylene glycol and less than about 1 wt % isosorbide; and
   c) continuing the reaction in the presence of a polycondensation catalyst at a pressure of about 0.25 to about 2 mm and a temperature of 260 to 275° C. to form a PEIT having a Hunter b* color value between about −2.0 and about +2.0.

2. The process of claim 1, wherein the mixture comprises terephthalic acid, ethylene glycol and isosorbide and the distillate comprises water.

3. The process of claim 2, wherein the mixture further comprises a polycondensation catalyst.

4. The process of claim 2, wherein the mixture further comprises a base selected from the group consisting of sodium acetate, sodium hydroxide and tetramethylammonium hydroxide.

5. The process of claim 4, wherein the molar ratio of base to terephthalic acid is 1:1800 to 1:13400.

6. The process of claim 5, wherein the base is tetramethylammonium hydroxide.

7. The process of claim 1, wherein the mixture comprises dimethyl terephthalate, ethylene glycol and isosorbide, and wherein the volatile alkanol product is methanol.

8. The process of claim 7, wherein the mixture further comprises a polycondensation catalyst.

9. The process of claims 1, 3 or 8, wherein said polycondensation catalyst is chosen from the group consisting of SB(III) salts; Ti(IV) salts; acetate salts of Co(II); acetate salts of Sb(II); alkanoate salts of Co(II); alkanoate salts of Sb(III); oxides of Sb(III); oxides of Sb(III); oxides of Ge(IV); glycol-solubilized oxides of Sb(II), Sb(III) and Ge(IV); and $Ti(OR)_4$, where R is an alkyl group having 2 to 12 carbon atoms.

10. The process of claim 9, wherein the molar ratio of catalyst to terephthalic acid or its alkyl ester is 1;1000 to 1:7300.

11. The process of claim 10, wherein the polycondensation catalyst is $GeO_2$.

12. The process of claim 2, wherein the temperature and pressure of the reaction are controlled in such a way that water is removed as a distillate only when the temperature of the overhead vapor is less than or equal to the boiling point of water at the pressure of the reaction.

13. The process of claim 7, wherein the temperature and pressure of the reaction are controlled in such a way that methanol is removed as a distillate only when the temperature of the overhead vapor is less than or equal to the boiling point of methanol at the pressure of the reaction.

14. The process of claim 1, wherein the mixture further comprises additives selected from the group consisting of infrared absorbing agents, dyes, pigments, and UV stabilizers.

15. The process of claim 2, wherein additives selected from the group consisting of infrared absorbing agents, dyes, pigments, and UV stabilizers are added to the mixture after removal of at least 80% of the water derived from the condensation of terephthalic acid with ethylene glycol and isosorbide.

16. The process of claim 7, wherein additives selected from the group consisting of infrared absorbing agents, dyes, pigments, and UV stabilizers are added to the mixture after removal of at least 80% of the methanol derived from the condensation of dimethyl terephthalate with ethylene glycol and isosorbide.

17. The process of claims 15 or 16, wherein said infrared absorbing agent is chosen from the group consisting of graphite and carbon black.

18. The process of claims 15 or 16, wherein said dyes and pigments are chosen from the group consisting of red, orange, yellow, blue, green, indigo and violet.

19. The process of claim 18, wherein said dyes and pigments are chosen from the group consisting of cobalt acetate, HS-325 Sandoplast® Red BE, HS-510 Sandoplast® Blue 2B, Polysynthren® Blue R, and Clariant® RSB violet.

20. The process of claim 1, wherein the isosorbide has a UV absorbance at 220 nm of less than 0.2.

21. The process of claim 1, further comprising the steps of:
   a) isolating the PEIT polymer in the form of pellets, flakes or strands;
   b) crystallizing the isolated PEIT polymer by heating the isolated PEIT polymer to a temperature in the range of about 125° C. to about 145° C. or treating the isolated PEIT polymer with a crystallization-inducing solvent; and
   c) heating the crystallized PEIT polymer under vacuum or in a stream of inert gas at an elevated temperature above about 190° C. but below the melting temperature of the crystallized PEIT polymer to yield a solid state polymerized PEIT polymer.

22. The process according to claim 20, further comprising the steps of melting mixing the solid state polymerized PEIT polymer with additives selected from the group consisting of infrared absorbing agents, dyes, pigments, and uv stabilizers.

23. The process according to claim 1, wherein the molar ratio of ethylene glycol to isosorbide is from about 6:1 to about 18:1.

24. A PEIT polymer made according to claims 1, 2, 7, 19 or 20 wherein the Hunter b* color of the PEIT polymer is between −2.0 and +2.0.

25. A PEIT polymer of claim 23, wherein the Hunter b* color is between −1.0 and +1.0.

26. A PEIT polymer made according to claims 14, 15, 16, or 21 wherein the Hunter b* color is between −2.0 and +2.0.

27. A shaped article made according to claim 26.

28. A rigid container made from the PEIT polymer of claims 23 or 25.

29. A film or sheet made from the PEIT polymer of claims 23 or 25.

30. A fiber or monofilament strand made from the PEIT polymer of claims 23 or 25.

31. An optical article made from the PEIT polymer of claims 23 or 25.

32. A polymer blend or alloy made from the PEIT polymer of claims 23 or 25.

33. The process of claim 4, wherein the molar ratio of base to terephthalic acid is 1;2700 to 1:6800.

34. The process of claim 10, wherein the molar ratio of catalyst to terephthalic acid or its alkyl ester is 1:2200 to 1:4400.

35. The process of claim 20, wherein the isosorbide has a UV absorbance at 220 nm of less than 0.1.

* * * * *